No. 705,223. Patented July 22, 1902.
E. DOERING.
BOX OR CASE.
(Application filed Feb. 13, 1901.)
(No Model.) 2 Sheets—Sheet 1.
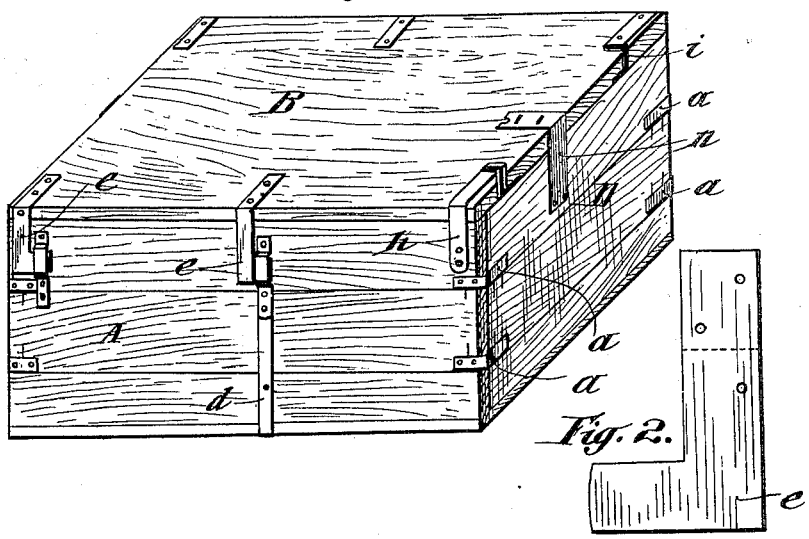
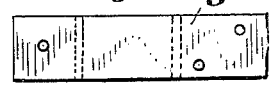
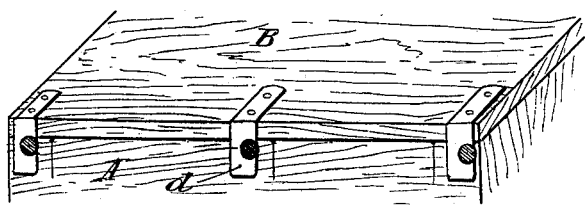
Witnesses
J. D. McMahon.
G. S. Noble
Inventor,
Ernst Doering
by B. Singer
Att'y.
THE NORRIS PETERS CO., PHOTO-LITHO., WASHINGTON, D. C.

No. 705,223. Patented July 22, 1902.
E. DOERING.
BOX OR CASE.
(Application filed Feb. 13, 1901.)
(No Model.) 2 Sheets—Sheet 2.
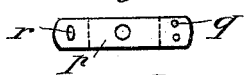
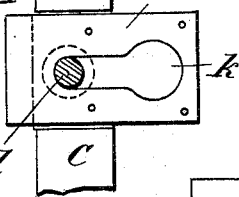
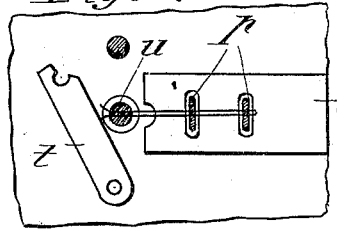
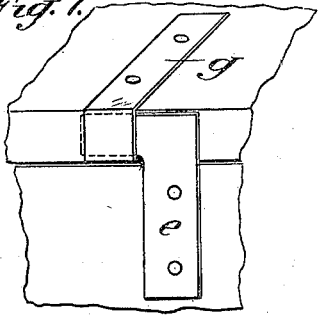
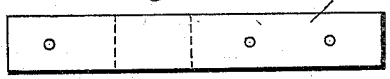
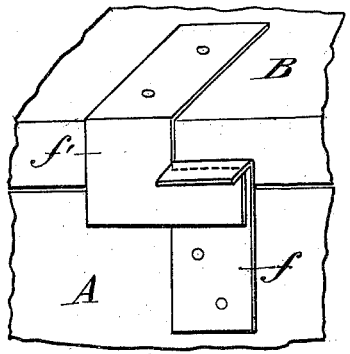
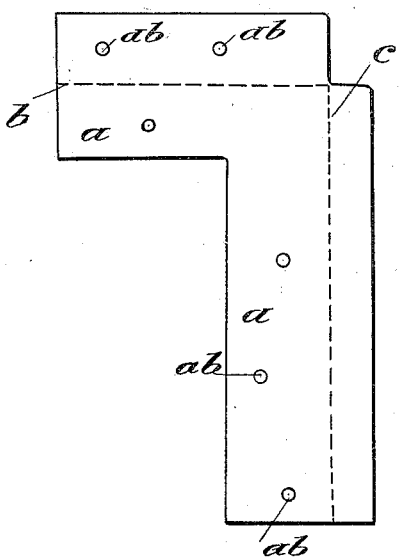
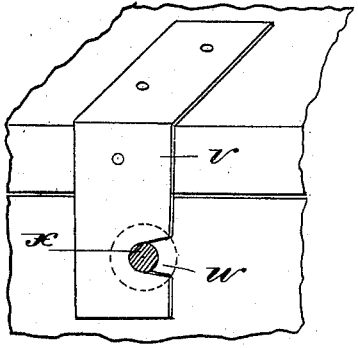
Witnesses:
T. W. McMahon.
G. S. Noble.
Inventor,
Ernst Doering
by P. B. Singer.
Att'y.
THE NORRIS PETERS CO., PHOTO-LITHO., WASHINGTON, D. C.

UNITED STATES PATENT OFFICE.

ERNST DOERING, OF BERLIN, GERMANY.

BOX OR CASE.

SPECIFICATION forming part of Letters Patent No. 705,223, dated July 22, 1902.

Application filed February 13, 1901. Serial No. 47,115. (No model.)

*To all whom it may concern:*

Be it known that I, ERNST DOERING, a subject of the German Emperor, and a resident of Berlin, Germany, have invented certain new and useful Improvements in Boxes or Cases, of which the following is a specification.

The object of my present invention is to provide means whereby cases may be securely closed, so that the bottom or the sides thereof cannot be detached accidentally when in use, and whereby the lid of the case may be easily removed, so that the case may be used several times.

The invention consists of the construction and novel combination of parts fully described and claimed hereinafter, reference being had to the accompanying drawings, wherein—

Figure 1 is a perspective view of a case provided with my improvements. Fig. 2 is a detail view of one member of one form of fastening device for connecting the cover or lid of the case with the side walls thereof. Fig. 3 is a detail view of the other member of the same fastening. Fig. 4 is a detail view of the means for connecting the cover or lid to one end of the case. Figs. 5 and 6 illustrate two forms of fastening means for connecting the lid or cover with the other end wall of the case. Figs. 7 and 8 illustrate a modified form of fastening for connecting the lid and a side wall of the case, Fig. 8 being a detail of one of the members of said fastening. Figs. 9 to 11 illustrate modified forms of fasteners for the same purpose as those illustrated in Figs. 2, 3, 7, and 8. Fig. 12 is a detail view, on an enlarged scale, of a modified form of plate for protecting the members or sections of the side walls of the case.

Referring to the drawings, A designates the body of the case, and B the removable lid or cover. The side and end walls may, as shown, be each composed of a series of sections D, arranged one upon the other and suitably secured together. Metal corner-plates or strengthening-bands $a$ may be provided, and the bottom of the case is strengthened and held in place within the side and end walls by means of a strap-like band $d$ passing under the same and secured to opposite walls of the body.

Suitable means are provided for connecting the top or lid B to the side walls of the case in such manner that said top will be held from vertical movement and also from lateral movement in all but one direction. Various forms of fastening devices may be employed for this purpose. As shown in Figs. 1 to 3, the top is provided with a suitable number of angle-pieces $e$, each having one member secured to the outer surface of the top and another extending at substantially right angles thereto downwardly over the adjacent side wall of the case. At the lower ends these depending members of the angle-pieces $e$ are each provided with a laterally-extending tongue or stud adapted to enter an eye or socket formed in or by the other member of the fastening $f$, which is permanently secured to the side of the case. It will be seen that with such a fastener the top or cover B is applied to the case by being moved laterally thereof, the hook-shaped ends of the angle-pieces $e$ thereby entering the eyes or sockets provided for them and acting to prevent vertical displacement of the lid or top. The members $ef$ of said fastening also prevent the lid from being shifted laterally in but one direction—namely, that in which the hook-shaped ends will be withdrawn from their receiving eyes or sockets.
Means are also provided for connecting the lid or cover with one of the end walls of the case by the same movement that engages the fasteners $ef$. Such means are illustrated in detail in Fig. 4 of the drawings, referring to which, J designates a plate having therein a slot or aperture K of the form shown, which plate is secured against the under side of the lid or top B. The plate J extends through a socket or recess formed in the upper edge of the end wall C of the case, and the slot or aperture K in said plate receives a pin or stud $l$, which is arranged within said socket or recess in the end wall C.

All of the fastening means above described act to hold the lid or cover B from movement in any direction excepting that in which the hook-shaped ends of the fastening members $e$ will be withdrawn from their keepers. To prevent movement of the lid or cover in this direction when the case is in use, a fastener, such as is shown in Figs. 1, 5, and 6, may be employed. This consists of a metallic piece of substantially right-angular form, one member n of which is secured by nails, screws, or other fastening means to an end wall of the case, while the other member o is provided with two slots, through which project the upturned ends r q of a plate p, which is fastened on the top of the lid B. A seal-wire may be passed through suitable apertures formed in said upwardly-extending ends r q above the member o of the fastener after the latter has been engaged with the plate p, and the free ends of said wire can be secured to a stud or screw u, extending upwardly from the lid. The outer end of this screw and the ends of said wire can be covered and concealed by a swinging bar, as indicated in Fig. 5.

Instead of securing the hook-shaped end of the fastener by which the lid or cover and the side walls of the case are connected to the lid said member e may, as shown in Fig. 7, be secured to the side wall and a suitable keeper g (shown in Figs. 7 and 8) provided on the lid. It is not necessary that an eye or socket member, such as shown in Figs. 1 and 8, should be provided, for, as shown in Fig. 9, two hook-shaped members f f' may be employed for connecting the lid and side walls of the case, or, as shown in Figs. 10 and 11, said fastening may consist merely of an angular plate v, rigidly and permanently secured to the cover and having formed in one edge of its depending portion a notch or recess w, adapted to engage with a screw or pin x, projecting laterally from the side of the case. The form of such fastener shown in Fig. 11 differs from that shown in Fig. 10 in that the recess or notch w is in the form shown in Fig. 11 only as deep as the diameter of the pin or screw x.

If desired, the corner-protecting plates a may be made in the form shown in Fig. 12 and adapted to be bent on the dotted lines b c, suitable openings a b being provided for the passage of nails or screws.

Having thus described my invention, what I claim, and desire to secure by Letters Patent, is—

The combination with a box or case, having a socket or recess formed in the upper edge of one end wall, and a vertical pin or stud arranged within said socket, of a top or lid, a slotted plate secured against the under surface of the top or lid and adapted to extend through said socket in the end wall of the box and engage the pin therein when the lid is moved in one direction over the box, fastening means secured to the top for engaging others on the sides of the box as the lid is moved laterally as aforesaid, and supplemental means for preventing movement of the lid on the box in a direction to disengage said fastenings.

In testimony whereof I have hereunto set my hand in presence of two witnesses.

ERNST DOERING.

Witnesses:
WOLDEMAR HAUPT,
HENRY HASPER.